(12) United States Patent
Blanc

(10) Patent No.: US 12,172,781 B2
(45) Date of Patent: Dec. 24, 2024

(54) METHOD AND SYSTEM FOR PACKAGING PRODUCTS BELONGING TO THE FRUIT AND VEGETABLE GROUP

(71) Applicant: MAF AGROBOTIC, Montauban (FR)

(72) Inventor: Philippe Blanc, Montauban (FR)

(73) Assignee: MAF AGROBOTIC, Montauban (FR)

( * ) Notice: Subject to any disclaimer, the term of this patent is extended or adjusted under 35 U.S.C. 154(b) by 0 days.

(21) Appl. No.: 18/013,213

(22) PCT Filed: Jun. 17, 2021

(86) PCT No.: PCT/FR2021/051101
§ 371 (c)(1),
(2) Date: Dec. 27, 2022

(87) PCT Pub. No.: WO2022/003267
PCT Pub. Date: Jan. 6, 2022

(65) Prior Publication Data
US 2023/0257142 A1 Aug. 17, 2023

(30) Foreign Application Priority Data
Jul. 2, 2020 (FR) ...................................... 20 07023

(51) Int. Cl.
*B65B 25/04* (2006.01)
*B65B 35/18* (2006.01)
(Continued)

(52) U.S. Cl.
CPC .............. *B65B 25/04* (2013.01); *B65B 35/18* (2013.01); *B65B 65/006* (2013.01);
(Continued)

(58) Field of Classification Search
None
See application file for complete search history.

(56) References Cited

U.S. PATENT DOCUMENTS

| 3,292,341 A | 12/1966 | Frost |
| 3,743,079 A | 7/1973 | Siciliano |

(Continued)

FOREIGN PATENT DOCUMENTS

| EP | 0644120 | 3/1995 |
| FR | 2983458 | 6/2013 |

(Continued)

OTHER PUBLICATIONS

International Search Report Jul. 28, 2021.

*Primary Examiner* — Kavel Singh
(74) *Attorney, Agent, or Firm* — IPSILON USA, LLP

(57) ABSTRACT

A method is provided for packaging objects which are included in a plurality of objects belonging to the fruit and vegetable group and the shape of which is such that the objects included in the plurality of objects can roll along a surface. The objects included in the plurality of objects are deposited onto a solid surface of a system for packaging the objects. The deposition surface is substantially horizontal, suitable for receiving the objects included in the plurality of objects and elastically deformable such that the deposition of each object on the deposition surface creates, under the weight of the object concerned, a recess in the deposition surface. This tends to wedge the object in the recess, then the objects included in the plurality of objects deposited onto the deposition surface and held in a position relative to the deposition surface which position is fixed during deposition and held subsequent to deposition due to the deposition surface, are removed from the deposition surface for the purpose of packing in a packaging container.

10 Claims, 5 Drawing Sheets

(51) Int. Cl.
*B65B 65/00* (2006.01)
*B65G 21/20* (2006.01)
*B65G 47/14* (2006.01)

(52) U.S. Cl.
CPC ..... *B65G 21/2045* (2013.01); *B65G 47/1492* (2013.01); *B65G 2207/14* (2013.01)

(56) References Cited

U.S. PATENT DOCUMENTS

| | | | | |
|---|---|---|---|---|
| 4,800,704 | A * | 1/1989 | Ishii | B65B 25/04 |
| | | | | 53/145 |
| 5,040,056 | A * | 8/1991 | Sager | B25J 9/0093 |
| | | | | 901/8 |
| 5,737,901 | A * | 4/1998 | De Greef | B65B 25/04 |
| | | | | 53/446 |
| 6,467,608 | B2 * | 10/2002 | Stauber | B65G 19/025 |
| | | | | 198/460.2 |
| 8,065,032 | B2 * | 11/2011 | Stifter | G05B 19/4182 |
| | | | | 700/214 |
| 10,954,078 | B2 * | 3/2021 | Crescenzo | B65G 47/907 |
| 11,766,006 | B2 | 9/2023 | Struijk et al. | |
| 2023/0257142 | A1 * | 8/2023 | Blanc | B65G 21/2045 |
| | | | | 53/396 |

FOREIGN PATENT DOCUMENTS

| | | |
|---|---|---|
| FR | 2998272 | 5/2014 |
| WO | 2020104619 | 5/2020 |

* cited by examiner

METHOD AND SYSTEM FOR PACKAGING PRODUCTS BELONGING TO THE FRUIT AND VEGETABLE GROUP

RELATED APPLICATION

This application is a National Phase of PCT/FR2021/051101 filed on Jun. 17, 2021 which claims the benefit of priority from French Patent Application No. 20 07023, filed on Jul. 2, 2020, the entirety of which are incorporated by reference.

FIELD OF THE INVENTION

The present invention relates to a method and a system for packaging objects that belong to the fruit and vegetable group and have a shape such that said objects are liable to roll over a surface.

PRIOR ART

In the field of packaging objects belonging to the fruit and vegetable group, installations in which such objects are deposited on a surface on which the objects are spread out in a depth of one in a random spatial distribution before being removed—notably one at a time—by a robot in order to be packaged are known. In such installations, the position of each object deposited on said surface is analyzed and digital data representative of the position of the objects in relation to said surface at the time they are deposited are transmitted to this robot, which is selected and programmed to be able to remove each object deposited on the surface taking into consideration the digital data for each object, and to move each object for the purpose of being packaged.

However, the Applicant has become aware that, with certain objects that have a shape such that said objects are able to roll over a surface (this observation applies notably to objects with an essentially spherical shape, such as oranges or apples, but also to objects such as pears, avocados etc., that is to say objects having an outer envelope at least part of which is curved), the position and/or the orientation in which the objects are deposited on said surface is liable to vary over time and notably between the time the objects are deposited on said surface and the time they are removed by the robot. Thus, the digital data that are representative of the position of each object at the time they are deposited and that are transmitted to the robot do not correspond to the actual position of each object on said surface at the time they are removed, such that the removal of at least one object can be made impossible owing to the lack of correspondence between the digital data representative of the position of said object when it is deposited and its actual position in relation to said surface at the time of removal.

Specifically, when these objects are deposited on said surface, because of their at least partially curved shape, they can be made to roll over themselves and thus change position and/or orientation on said surface, such that their position and/or orientation at the time they are removed by the robot differs from their position and/or orientation at the time they are deposited, making it impossible or unsuitable for the robot to effectively remove them. In particular, they can be made to roll over themselves and thus change position and/or orientation on said surface when other neighboring or directly adjacent objects present on said surface are being removed.

In particular, when these objects are deposited on the surface of a conveyor, because of their at least partially curved shape, they can be made to roll over themselves and thus change position on the surface of the conveyor. The objects can be made to roll over themselves and to change orientation and/or position on the surface of the conveyor while the conveyor is at a standstill, but also while the conveyor is moving.

Thus, in some installations for packaging objects belonging to the fruit and vegetable group, such objects—if appropriate, after having been sorted according to their dimensions, their weight, their color or according to any other measurable criterion—are removed and handled by a first robot in order to be deposited on a horizontal surface of a conveyor such that, on said surface, the objects form at least one object set forming a predetermined set pattern. The conveyor is moved in order to transport the objects thus deposited (in the predetermined set pattern) as far as a withdrawal area, where these objects are intended to be handled by a second robot and, for example, placed in containers, such as crates, for the transport of said objects.

It is important that the objects deposited on the conveyor, each in a predetermined position, notably in relation to the position of other, previously deposited objects, keep this position in the course of being transported in order that the second robot can take them in this same predetermined position.

Furthermore, starting the movement of the conveyor after depositing the objects constitutes another factor liable to make said objects change position and/or orientation on the surface of the conveyor.

In general, any acceleration or deceleration phase of the conveyor is of a nature that causes the objects to change position and/or orientation on the surface of the conveyor.

When the objects are deposited on a conveyor which is already moving, the position of the objects is even more liable to be modified between the time of deposition, for example, by a first robot and the later time at which these objects are taken, for example, by a second robot.

OBJECTS AND SUMMARY

In view of the above, it would therefore be particularly useful to be able to remedy at least some of these problems in order that the objects deposited on a surface—notably on the surface of a conveyor—at a given time in a determined position and/or determined orientation, notably in a predetermined position in relation to the position of other, already deposited objects, keep the same position and/or the same orientation on the conveyor over time and that this position and/or this orientation is maintained to be able to take action on the objects thus positioned for the purpose of packaging them in an automated manner.

The invention aims to overcome all of these drawbacks.

The invention relates to a method for packaging a plurality of objects that belong to the fruit and vegetable group and have a shape such that the objects of the plurality of objects are able to roll over a surface—notably over a horizontal flat surface—;

characterized in that the objects of the plurality of objects are deposited on a solid surface, referred to as deposition surface, of a system for packaging said objects, said deposition surface being:
 substantially horizontal;
 suitable for receiving the objects of the plurality of objects; and
 elastically deformable such that the deposition of each object on said deposition surface creates, under the effect of the weight of the object in question, an imprint in said deposition surface which tends to wedge said object in said imprint; and then the objects of the plurality of objects deposited on said deposition surface and maintained in a position in relation to said deposition surface, referred to as deposition position, which is fixed during the deposition and maintained after the deposition owing to said deposition surface, are removed from said deposition surface for the purpose of packaging them in a packaging container.

The stabilization or wedging of the objects is obtained by the local temporary deformation, for example elastic deformation, of the area of said deposition surface on which the object is deposited (by the effect of the weight of the object in the area) and which tends to wedge the object in this position, thus preventing it from rolling over itself naturally, either at the time it is deposited or during a movement applied to said deposition surface and, notably, during a startup phase of a conveyor comprising said deposition surface, during a standstill phase of this conveyor, during an acceleration phase or during a slowing down phase of this conveyor.

Moreover, this wedging of the objects that is obtained by the local temporary deformation of that area of said deposition surface on which the object is deposited also prevents said object from rolling when objects are deposited next to and/or in contact with objects deposited on said deposition surface, or when neighboring or adjacent objects are being removed from said deposition surface.

In some embodiments, the packaging method according to the invention is a method for packaging a plurality of objects belonging to the citrus fruit group—notably oranges, clementines, tangerines, grapefruit, lemons.

When the objects are removed or withdrawn from said deposition surface, the predetermined local areas of said deposition surface that have been temporarily deformed, for example elastically, by the weight of the objects return to their initial, non-deformed shapes, ready to be used again for other objects.

According to the invention, the objects of the plurality of objects are deposited on said deposition surface so as to form a single layer of objects and such that each object is in contact with said deposition surface. The objects of the plurality of objects are deposited on said deposition surface in a random spatial deposition orientation in relation to said deposition surface and in a deposition position on said deposition surface that are maintained over time.

Thus, inasmuch as the objects of the plurality of objects deposited (at the same time or at several times) on said deposition surface are stabilized/wedged at the time they are deposited and thus remain stabilized on said deposition surface until a decision is made to remove them from said deposition surface and/or to modify their positions and/or their orientation on said deposition surface, the position that they each occupy when they are deposited and/or the orientation that they each have when they are deposited (and that is known to the management member of the packaging system) stays the same over time. According to the invention, the elastic deformation of said deposition surface is temporary and temporally limited to the presence of the object on said deposition surface. The subsequent removal of the object causes the imprint formed owing to the deposition of the object to disappear.

In some embodiments, there is nothing to stop said deposition surface being a surface of an immovable plate of the packaging system. In other embodiments, said deposition surface is a conveying surface of a conveyor, notably a conveying surface of a conveyor belt, also referred to as belt conveyor.

In these embodiments according to the invention, the objects of the plurality of objects maintained in said deposition position and in said deposition orientation owing to said deformable deposition surface are withdrawn from said deformable deposition surface and transferred to a packaging area remote from said deformable deposition surface.

In some embodiments of a method according to the invention:
  said deposition surface is a substantially horizontal conveying surface of a conveyor of the packaging system, said conveying surface being elastically deformable such that the deposition of each object on said conveying surface creates, under the effect of the weight of the object in question, an imprint in said conveying surface which tends to wedge said object in said imprint, in that:
  the objects of the plurality of objects are transported by the conveyor and maintained in said deposition position during the transport owing to said conveying surface, and in that:
  the objects of the plurality of objects maintained in said deposition position are removed from the conveyor and transferred to a packaging area remote from this conveyor in order to package them in the packaging container.

The local deformation of the area of the conveying surface that extends facing the object thus creates a preferred position (recess or niche) in which the object is located and the peripheral region of the surface surrounding this deformed area (this peripheral region being substantially not deformed) prevents any movement of the object. Any type of locally deformable surface is possible. By way of example, said deposition surface—notably said conveying surface of the conveyor—comprises a layer of a material which has a generally flat appearance when no stress is applied on top of it and which, under the action of a stress caused by a weight, is elastically deformed by denting. The peripheral edges of the dented area (the edges appear raised in relation to the recess forming the deformed area) generally prevent any subsequent movement of the object placed in the dented area. According to another example, said deposition surface—notably the conveying surface of the conveyor—has a plurality of elastically deformable pins or rods which form a kind of carpet on which the objects are deposited. When an object is being deposited, the deformable pins or rods deform and move away from one another and/or flatten so as to form the preferred position, the recess or the niche for the object. The deformable pins or rods that are located around the area where the pins/rods have been deformed and that, in turn, are only deformed a little or are not deformed thus form a peripheral edge, as it were, which generally prevents any subsequent movement of the object thus positioned/nested.

Inasmuch as the objects of the plurality of objects deposited (at the same time or at several times) on the surface are stabilized/wedged at the time they are deposited and thus remain stabilized during their transport on the conveyor (until a decision is made to remove them from the conveyor and/or to modify their positions on the conveyor), the position that they each occupy when they are deposited (and that is known to the management member of the packaging system) stays the same over time, in particular throughout the time in which the objects are being moved on the conveyor.

According to some embodiments of a method according to the invention, the objects of the plurality of objects are deposited on said deposition surface—notably on said conveying surface—in this way such that the set of objects thus deposited on said deposition surface forms a random set pattern on said deposition surface.

A packaging method according to the invention comprises a step of random deposition (that is to say, a deposition step in which the objects are deposited in bulk on said deposition surface—notably on said conveying surface—but without superposition of the objects) such that the objects of the plurality of objects form a random set pattern. During such a random deposition step, neither the position nor the orientation of each object deposited on said deposition surface in relation to said deposition surface are determined before the deposition or during the deposition. That being said, the position and/or the orientation of each object can be determined and digital data representative of the position of each object of the plurality of objects deposited in bulk in relation to the conveyor can be determined at the end of the random deposition step. By virtue of the wedging of the objects on said deposition surface, the position and/or the orientation of each object in relation to said deposition surface remain(s) substantially unchanged over time—and can be determined—until they are taken up by at least one robot of the packaging system that knows their positions.

Of course, when the objects of the plurality of objects deposited on said deposition surface form a random set pattern, this random set pattern is maintained during the transport of the objects by said supply conveyor owing to said deformable conveying surface.

According to some embodiments of a method according to the invention, the objects of the plurality of objects are deposited on said deposition surface—notably on said conveying surface—such that the set of objects thus deposited on said deposition surface forms a predetermined set pattern on said deposition surface.

When the set of objects are thus deposited on said conveying surface of said packaging conveyor so as to form a predetermined set pattern, said deposition position, said deposition orientation and the predetermined set pattern are maintained owing to said deformable surface during the transport of the objects of the plurality of objects by this conveyor toward a downstream area of this conveyor.

The objects of the plurality of objects can be deposited so as to jointly form a predetermined set pattern—notably regular or irregular geometric pattern—(for example an arrangement in the shape of a mosaic or a matrix, rectangular or square) on the surface of the conveyor. In this geometric configuration, the objects all have known fixed geometric positions (deposition position) in relation to one another. By virtue of the wedging of the objects on the surface of the conveyor, the geometric positions of said objects remain the same over time until they are taken up by at least one robot of the packaging system that knows their positions. Such a robot has at least one handling member positioned suitably in relation to the objects depending on the known position of these objects in the predetermined set pattern and can thus come into contact with these objects and move them on said deposition surface or grip them in order to withdraw them from said deposition surface and to transport them away for the purpose of packaging them.

In some embodiments, a method according to the invention comprises:
- a first step of randomly depositing objects of the plurality of objects on a conveying surface of a first conveyor, referred to as supply conveyor, which extends upstream of the packaging system, the conveying surface of said supply conveyor being elastically deformable such that the deposition of each object on said conveying surface creates, under the effect of the weight of the object in question, an imprint in said conveying surface which tends to wedge said object in said imprint, which means that the set of objects thus deposited forms a random set pattern on said conveying surface of said supply conveyor, the random set pattern being maintained while the objects of the plurality of objects are being transported by said supply conveyor; and
- a step of removing the objects of the plurality of objects transported on said supply conveyor; and
- a second, subsequent step of depositing objects of the plurality of objects on a second conveyor, referred to as packaging conveyor, which extends downstream of the packaging system, the conveying surface of said packaging conveyor being elastically deformable such that the deposition of each object on said conveying surface creates, under the effect of the weight of the object in question, an imprint in said conveying surface which tends to wedge said object in said imprint, in such a way that the set of objects of the plurality of objects thus deposited forms a predetermined set pattern on said deposition surface of said packaging conveyor;

the terms upstream and downstream being defined in relation to a direction of movement of the objects.

In these embodiments of a method according to the invention:
- the objects of the plurality of objects forming the predetermined set pattern on the conveying surface of said packaging conveyor are transported by said packaging conveyor, the predetermined set pattern being maintained during the transport owing to said deformable conveying surface; and
- all or some of the objects of the plurality of objects forming the predetermined set pattern are removed at the same time from said packaging conveyor and deposited in the packaging container.

In these embodiments, the objects are disposed in the packaging container—for example in a crate or a tray—so as to have the predetermined set pattern.

According to these embodiments of a method according to the invention, the objects of the plurality of objects removed at the same time are compacted so as to form a predetermined set pattern of reduced size after compaction in the packaging container.

In some embodiments, the objects are compacted during the deposition. In this embodiment, the objects of the plurality of objects deposited in the packaging container are compacted so as to be in contact with one another in the packaging container.

According to some embodiments of a method according to the invention, an analysis of said deposition position of each object of the plurality of objects on said deposition surface is carried out and data representative of the position of each object of the plurality of objects on said deposition surface are produced from this analysis.

Such an analysis is carried out by known means, notably by imaging and image analysis. It makes it possible to determine the position of each object on said deposition surface—notably on said deposition surface while said supply conveyor is moving. The imaging and image analyzing means make it possible to produce data representative of the position of each object transported on said supply conveyor, this position being defined and unchanged in relation to said supply conveyor owing to said deformable surface. Such data representative of the position of each object of the plurality of objects on said deposition surface are designed to be able to be transmitted to a robot programmed to be able to remove the objects of the plurality of objects distributed over said deposition surface on the basis of these representative data.

According to some embodiments of a method according to the invention:
the objects of the plurality of objects transported on said supply conveyor are removed—notably removed one at a time—from said supply conveyor by a first robot, referred to as configuration robot, on the basis of the data representative of said deposition position of each object of the plurality of objects on said deposition surface and transferred by said configuration robot to said packaging conveyor, on which they are deposited by said configuration robot so as to form the predetermined set pattern; and then
the objects of the plurality of objects forming the predetermined set pattern are removed at the same time from said packaging conveyor and then deposited for the purpose of packaging them in the packaging container.

According to some particular embodiments of a method according to the invention:
a plurality of objects that belong to the fruit and vegetable group and have a shape such that the objects of the plurality of objects are able to roll over a surface are deposited on said supply conveyor. The objects are deposited—for example by being poured out or by any other manual or automated means—whereby these objects form a random set pattern depending on the mode of deposition; then
the objects of the plurality of objects are transported by said supply conveyor, with maintenance of the position and the orientation of each object on said supply conveyor owing to said deformable conveying surface, and such that the random set pattern is maintained during the transport; then
an analysis of the position of the objects of the plurality of objects on said supply conveyor is carried out and data representative of the position of each object of the plurality of objects on said supply conveyor are produced from this analysis; then
each object of the plurality of objects is removed one at a time from said supply conveyor by said configuration robot (on the basis of the data representative of the position of each object on said supply conveyor) and transferred to said packaging conveyor on which they are deposited (on the basis of data representative of a predetermined set pattern) so as to form the predetermined set pattern; and then
the objects of the plurality of objects forming the predetermined set pattern are removed at the same time from said packaging conveyor by a second robot, referred to as packaging robot, and deposited by said packaging robot in a packaging container for the purpose of packaging the objects.

The invention extends to a system for packaging a plurality of objects that belong to the fruit and vegetable group and have a shape such that the objects of the plurality of objects are able to roll over a surface, the system comprising:
at least one solid surface, referred to as deposition surface, which is:
substantially horizontal;
elastically deformable such that the deposition of each object on said deposition surface creates, under the effect of the weight of the object in question, an imprint in said deposition surface which tends to wedge said object in said imprint; and
suitable for receiving the objects of the plurality of objects and for maintaining each object in a position in relation to said deposition surface, referred to as deposition position, which is fixed during the deposition and maintained after the deposition owing to said deposition surface; and
means for removing said objects deposited on said deposition surface and maintained in said deposition position owing to said deposition surface, in order to package them in a packaging container.

The system has the same advantages as the method briefly described above, which will not be repeated here.

In some embodiments of a system according to the invention:
said deposition surface is a conveying surface of a first conveyor, referred to as supply conveyor, which is located in the upstream part of the packaging system; said conveying surface being substantially horizontal and elastically deformable such that the deposition of each object on said conveying surface creates, under the effect of the weight of the object in question, an imprint in the conveying surface which tends to wedge said object in this imprint, said supply conveyor having:
an upstream area for the random deposition of objects on the conveying surface of said supply conveyor; and
a downstream area for the withdrawal of the objects maintained in this random position in relation to said supply conveyor during the transport; and
at least one robot, referred to as configuration robot, for withdrawing objects, transported on said supply conveyor, one at a time and for depositing these objects in such a way that the set of objects thus deposited forms a predetermined set pattern;
the upstream area and downstream area of the supply conveyor being defined in a direction of advancement of said supply conveyor.

In these embodiments, the system according to the invention is fitted with at least one video device designed to be able to generate data representative of the deposition position of each of the objects on the conveying surface of said supply conveyor. Advantageously, said at least one video device comprises at least one camera. Said at least one video device is interposed between the upstream deposition area and the downstream withdrawal area of said supply conveyor.

In these embodiments, the system according to the invention, apart from said supply conveyor, comprises:
a second conveyor, referred to as packaging conveyor, which is disposed downstream of said supply conveyor and comprises:
an upstream area for the deposition of the objects of the plurality of objects such that the set of objects thus deposited forms a predetermined set pattern on the surface of said packaging conveyor; and
a downstream area for the withdrawal of the objects maintained in this predetermined set pattern in relation to said packaging conveyor during the transport; and
at least one second robot, referred to as packaging robot, for removing objects of the plurality of objects transported on said packaging conveyor in the predetermined set pattern and for depositing these objects in the predetermined set pattern in a packaging container.

In these embodiments according to the invention, said packaging conveyor comprises a solid conveying surface which is substantially horizontal and deformable such that the deposition of each object on the surface creates, under the effect of the weight of the object in question, an imprint in the surface which tends to wedge said object in a position, referred to as deposition position, which is fixed in relation to the surface of said packaging conveyor, which means that the predetermined set pattern of the plurality of objects is maintained during the transport on said packaging conveyor.

According to some embodiments, the elastically deformable material is a foam, the upper face of which at rest is substantially flat and which elastically deforms so as to form said imprint under the effect of the weight of the object.

According to some other embodiments, the elastically deformable material is formed by a plurality of rods that are flexible in longitudinal compression or torsion and extend perpendicularly from the main face of the conveyor.

The invention likewise relates to a packaging method and system characterized, in combination or individually, by all or some of the features mentioned above or below. Irrespective of the formal presentation given, unless explicitly indicated otherwise, the various features mentioned above or below should not be considered to be intrinsically or inextricably linked to one another, it being possible for the invention to relate to only one of these structural or functional features, or only a part of these structural or functional features, or only a part of one of these structural or functional features, or any grouping, combination or juxtaposition of all or part of these structural or functional features.

BRIEF DESCRIPTION OF THE DRAWINGS

Other aims, features and advantages of the invention will become apparent on reading the following nonlimiting detailed description of some possible embodiments, with reference to the appended figures, in which.

DETAILED DESCRIPTION

Figure 1:
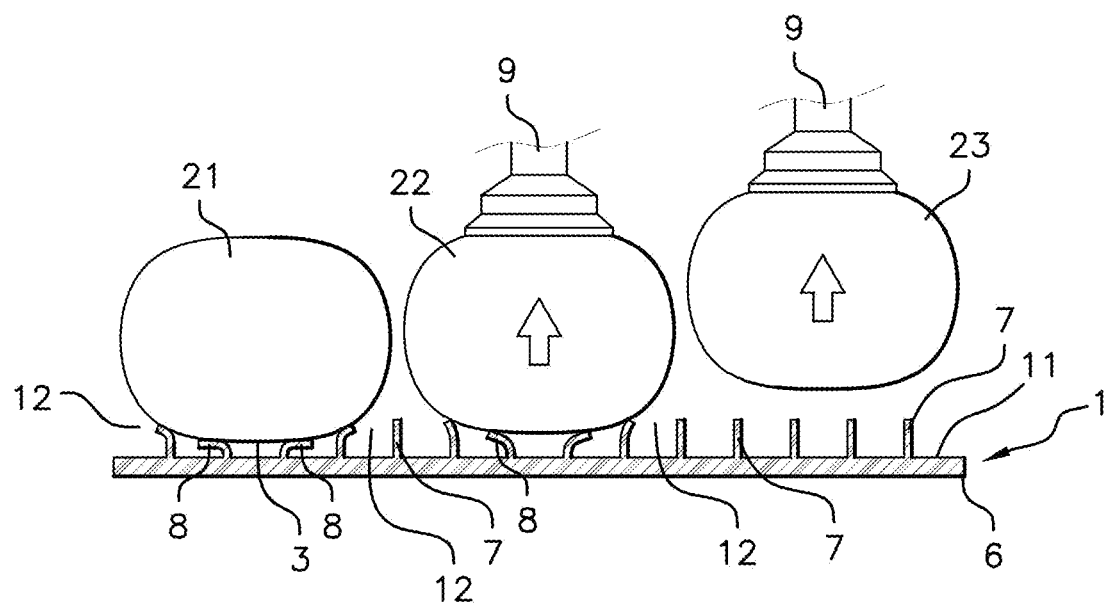
FIG. 1 is a sectional depiction of a detail of a first embodiment of a deposition surface of a packaging system according to the invention.

FIG. 1 schematically shows a particular embodiment of a deposition surface 1 for an object that belongs to the fruit and vegetable group and has a shape (shown schematically) such that this object is liable to roll over a surface, notably over a flat and horizontal solid surface. Said object may be a substantially spherical fruit such as a citrus fruit, notably an orange, a grapefruit, a tangerine, a clementine, etc. or such as an apple, but also a substantially non-spherical object such as a pear, an avocado, a lemon, for example. It is an object at least part of the external envelope of which is curved, such that the simple deposition of such an object on a horizontal, flat, solid and non-deformable surface in the vast majority of cases causes the object to roll spontaneously and uncontrollably over this surface, the orientation of the object on this surface to be modified, and the position of the object on this surface in relation to the position and the orientation of the object when it is being deposited to be modified. Thus, the position and the orientation of the object deposited on this horizontal, flat, solid and non-deformable surface is liable to vary over time, notably between the time at which the object is deposited on the surface and the time at which it is removed by a robot, on the basis of digital data representative of the position of the object when it is deposited. Specifically, since the orientation of the object and its position on the solid, non-deformable surface change between the time the object is deposited and the time intended for it to be removed, the data representative of the position and/or the orientation of the object during the deposition no longer correspond to the position and/or the orientation of the object in relation to the non-deformable surface during the removal phase of the object and the removal of the object by the robot is made impossible or at the very least not compatible. The invention aims to overcome this drawback.

The deposition surface 1 for an object 21, 22, 23 of a packaging system according to the invention that is shown in FIG. 1 comprises a base 6 formed of a material which is flexible and elastically deformable in transverse compression. Said material may be a polymer material, notably PVC, that complies with regulations relating to its coming into contact with foodstuffs. The base 6 may have any thickness suitable for use on (or as) a fixed plate for receiving objects to be packaged in a packaging system according to the invention or for use as a movable conveying belt of a conveyor of a system according to the invention for packaging objects. One of the main faces, referred to as upper face 11, of the base 6 has a plurality of pins 7 installed substantially perpendicularly to the main plane of the base 6. The pins 7 are evenly distributed over said main face 11. The density of the pins 7 over the main face 11 can vary depending on the average size of the object and its average weight. It can vary between 50 to 200 pins per m$^2$ of surface area of the base 6. The pins 7 are made from a material which is flexible and elastically deformable in transverse flexion. However, there is nothing to stop the pins 7 being elastically deformable in longitudinal compression. The pins 7 may be made from a polymer material, notably PVC, that likewise complies with regulations relating to its coming into contact with foodstuffs. In particular, the base 6 and the pins 7 forming the deposition surface 1 are washable.

The embodiment of FIG. 1 schematically shows the modifications of the deposition surface 1 owing to the removal of an object 21 deposited on said surface. In the left-hand part of FIG. 1, the object 21 deposited on the deposition surface 1, under the effect of its own weight and solely under the effect of its own weight, causes the pins 7 extending facing the object 21 to deform in transverse flexion. This results in the formation of an imprint 3 in the deposition surface 1 that is defined by the deformed pins 8 and forms a peripheral edge 12 of the imprint 3 delimiting the imprint 3 and wedging the object 21 in this imprint 3. The position and the orientation of the object 21 in relation to the deposition surface 1 are fixed when the object 21 is being deposited and no significant reorientation and/or repositioning movement of the object 21 after the deposition is possible owing to said deposition surface 1. In the central part of FIG. 1, an object 22 interacts with a gripping member 9—notably a gripping member having a suction cup—of a robot for removing the object 22 according to the arrow indicated in FIG. 1. Owing to the removal of the object 22 by the gripping member 9 that is in progress, the distance between the lower face of the object 22 and the base 6 of the deposition surface 1 increases and the deformed pins 8 extending facing the object 22 undergo partial elastic deformation owing to the vertical movement of the object 22 removed by the removal robot, in the process tending to return to the shape of non-deformed pins 7. This elastic deformation of the deformed pins 8 continues in the right-hand part of FIG. 1, in which the vertical movement of the gripping member 9 of the removal robot causes the object 23 to move away from the deposition surface 1 such that the pins 7 are not subject to the stress caused by the weight of the object 23 and return to the non-deformed state. Of course, FIG. 1 may also be interpreted from the right to the left in the sense of depositing an object 23 on the deposition surface 1, the arrows pointing upward and showing the removal of the object 21, 22, 23 in FIG. 1 being replaced by arrows pointing downward in the situation in which the object 23 is deposited.

Figure 2:
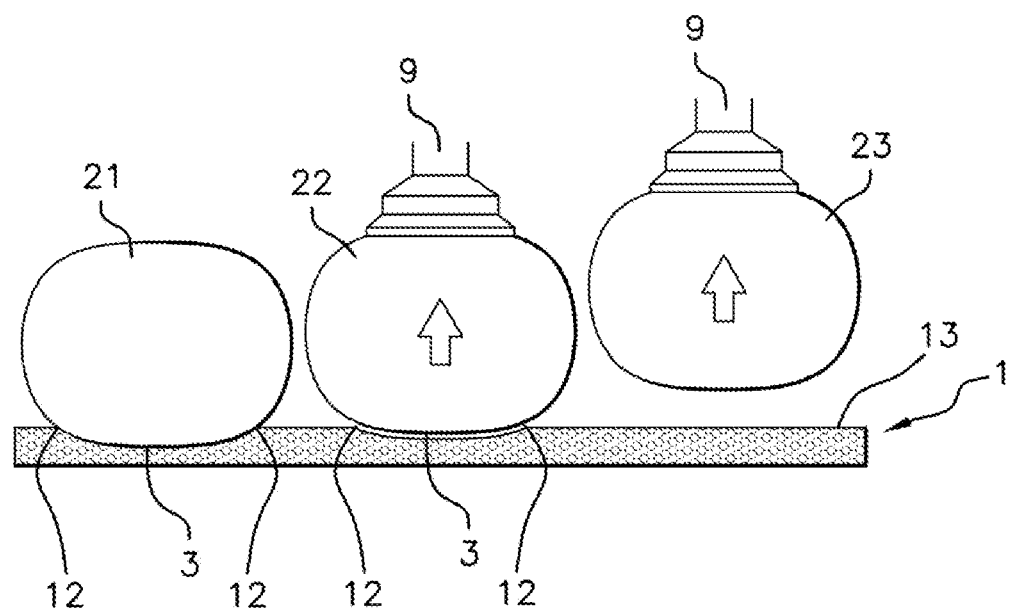
FIG. 2 is a sectional depiction of a detail of a second embodiment of a surface of a conveyor of a packaging system according to the invention.

FIG. 2 schematically shows another particular embodiment of a deposition surface 1 for an object that belongs to the fruit and vegetable group and has a shape (shown schematically) such that this object is liable to roll over a surface, notably over a flat and horizontal solid surface. The deposition surface 1 for an object 21, 22, 23 of a packaging system according to the invention that is shown in FIG. 2 is formed by a strip 13 of solid foam which is flexible and elastically deformable in compression along the axis orthogonal to its surface. Said foam may be a polyurethane foam or a foam made of any other material that complies with regulations relating to its coming into contact with foodstuffs. The strip 13 of foam may have any thickness suitable for use on (or as) a fixed plate for receiving objects to be packaged in a packaging system according to the invention. The strip 13 of foam may be a band 13 of movable conveying foam of a conveyor of a system according to the invention for packaging objects. The band 13 of foam is made of a material which is flexible and elastically deformable in compression along the axis orthogonal to its surface. The band 13 of foam likewise complies with regulations relating to its coming into contact with foodstuffs and is washable.

The embodiment of FIG. 2 schematically shows the modifications of the deposition surface 1 owing to the removal of an object 21 deposited on said surface. In the left-hand part of FIG. 1, the object 21 resting on the strip 13 of foam causes local deformation in transverse compression of part of the strip 13 of foam extending facing the object 21, under the effect of the weight of the object 21 and solely under the effect of the weight of the object 21. This results in the formation of an imprint 3, by denting, in the deposition surface 1 forming a peripheral edge 12 of the imprint 3 delimiting the imprint 3 and wedging the object 21 in this imprint 3. The position and the orientation of the object 21 in relation to the strip 13 of foam are fixed when the object 21 is being deposited and no significant reorientation and/or repositioning movement of the object 21 after the deposition is possible owing to said deposition surface 1. The peripheral edge 12 of the dented area forming the imprint 3 (the edges appear raised in relation to the recess forming the deformed area) substantially prevents any subsequent movement of the object 21 placed in the imprint 3 it has formed. In the central part of FIG. 2, an object 22 interacts with a gripping member 9 of a robot for removing the object 22 according to the upwardly directed arrow indicated in FIG. 2. Owing to the removal of the object 22 by the gripping member 9 that is in progress, the distance between the lower face of the object 22 and the strip 13 of foam of the deposition surface 1 increases and that part of the strip of foam that is no longer in contact elastically returns to a non-deformed, substantially flat shape owing to the vertical movement of the object 22 removed by the removal robot. This elastic deformation of the strip 13 of foam continues in the right-hand part of FIG. 2, in which the vertical movement of the gripping member 9 of the removal robot causes the object 23 to move away from the deposition surface 1 such that the strip 13 of foam is not subject to the stress caused by the weight of the object 23 and returns to a non-deformed state. In this non-deformed state, the deposition surface 1 of the strip 13 of foam has a flat overall appearance, since no stress is applied to this deposition surface 1.

Figure 3:
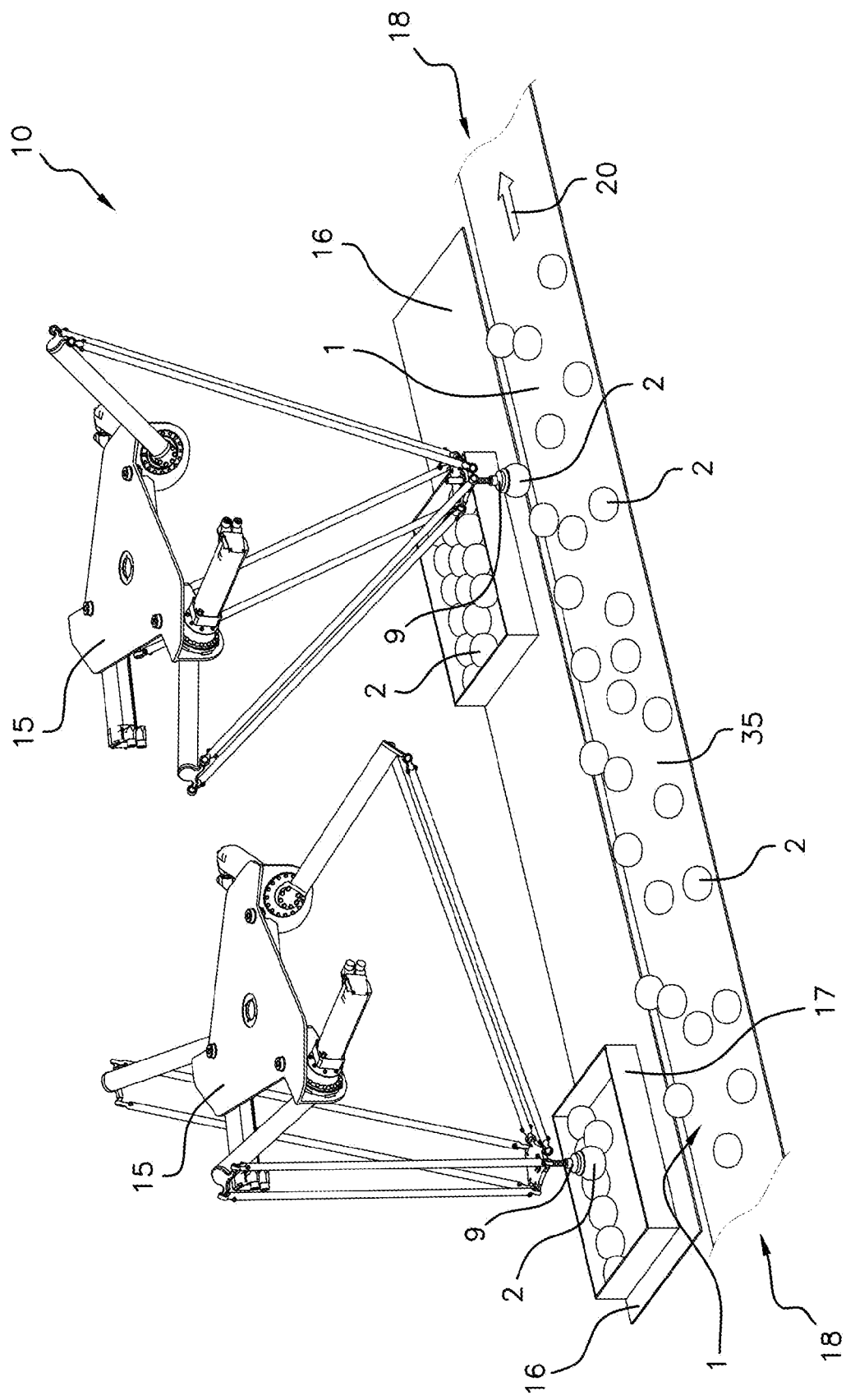
FIG. 3 is a perspective depiction of a first embodiment of an object packaging system according to the invention.

One particular embodiment of a system 10 according to the invention for packaging objects 2 and an implementation of this packaging system 10 is shown in FIG. 3. In this embodiment, the object deposition surface 1 is a conveying surface 19 of a conveyor 18 for objects 2, notably for clementines 2, which are shown schematically. The conveying surface 19 is substantially flat and exhibits said deposition surface 1 on the upper face of the conveyor 18. Said conveying surface 19 of the conveyor 18 is elastically deformable such that the deposition of each object 2 on said conveying surface 19 creates, under the effect of the weight of the object 2 in question, an imprint in said conveying surface 19 which tends to wedge said object 2 in this imprint. In this way, the objects 2 deposited on said conveying surface 19 of the conveyor 18 are maintained over time in the position and the orientation that they had when they were deposited on the conveyor 18, solely because of said elastically deformable conveying surface 19. The objects 2 deposited are maintained including when the conveyor 18 is in the conveying phase, in the acceleration phase, in the slowing down phase, in the startup phase or in the standstill phase. No spontaneous repositioning or other spontaneous reorientation of the objects 2 on the conveyor 18 is possible. The objects 2 may be deposited on the conveyor 18 by any deposition means. This may involve a manual or automated deposition of objects 2. The objects may be deposited, depending on how fragile they are, individually or by pouring out a plurality of objects 2 onto said conveying surface 19 of the conveyor 18.

The system 10 according to the invention for packaging objects 2 that is shown in FIG. 3 comprises a second plate 16 for packaging and presentation containers 17 for packaging objects 2. In the embodiment shown in FIG. 3, the packaging plate 16 is a fixed plate on which the packaging containers 17 are disposed in predetermined or determinable positions. The packaging containers 17 may be crates or trays in which the objects 2 are disposed for the purposes of storing, transporting and/or presenting them for the purpose of selling the objects 2. The system 10 according to the invention for packaging objects 2 that is shown in FIG. 3 comprises two robots, referred to as configuration robots 15, for removing and handling the objects 2 circulating on the conveyor 18. These robots may be Delta robots. That being said, the use of any other type of robot for handling and moving objects is possible. Each robot 15 is provided with a member 9 for gripping an object 2, which gripping member is designed to be able to interact with an object 2, remove this object 2 that is disposed on the conveyor 18, move this object 2 to the packaging plate 16, and dispose the transported object 2 in a packaging container 17 disposed on the packaging plate 16. Of course, the system 10 according to the invention for packaging objects 2 that is shown in FIG. 3 comprises means (not shown in FIG. 3) for analyzing the position of each object 2 disposed on the conveyor 18, which means are able to generate digital data representative of the position of each object 2 in relation to the conveyor 18 when the objects 2 are being deposited. These analyzing means may, for example, comprise a digital image acquisition device and a computer system for analyzing these digital images that is designed to generate these digital data. These digital data representative of the position of each object 2 on the conveyor 18 are transmitted to a system for controlling the actuation of said configuration robots 15, whereby each robot 15 is able to remove each object 2 on the conveyor 18, to move each removed object 2 between the conveyor 18 and the packaging plate 16, and to deposit the moved object 2 in a packaging container 17 for the objects 2 in a predetermined position of said packaging container 17.

Figure 4:
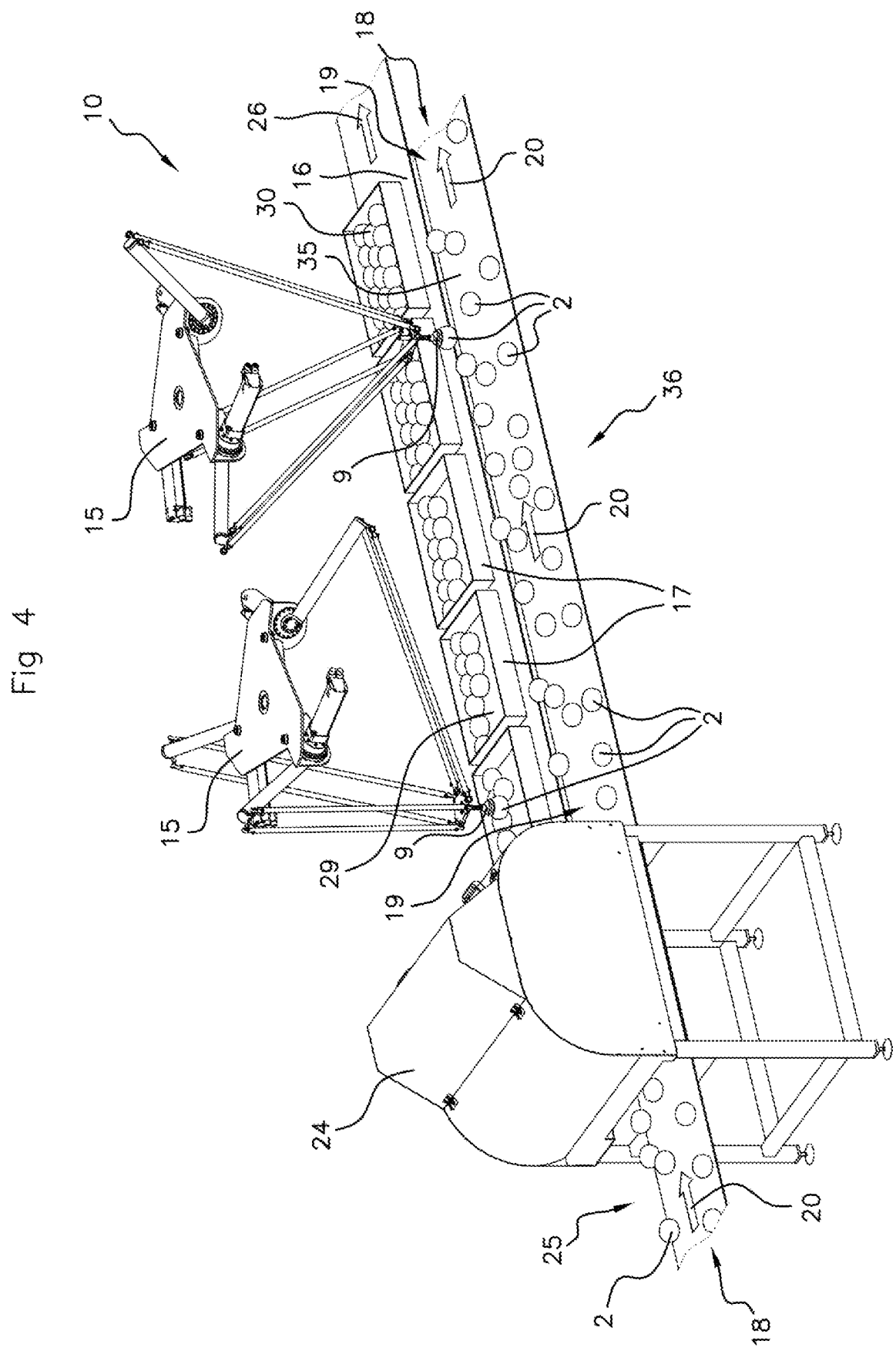
FIG. 4 is a perspective depiction of a second embodiment of an object packaging system according to the invention.

One particular embodiment of a system 10 according to the invention for packaging objects 2 and an implementation of this packaging system 10 is shown in FIG. 4. In this embodiment, the object deposition surface is a conveying surface 19 of a conveyor 18 for conveying objects 2 in movement in a movement direction indicated in FIG. 4 by the arrow 20. The conveying surface 19 of the conveyor 18 is elastically deformable such that the deposition of each object 2 on said conveying surface 19 creates, under the effect of the weight of the object 2 in question, an imprint in said conveying surface 19 which tends to wedge said object 2 in this imprint. In this way, the objects 2 deposited on the conveying surface 19 of the conveyor 18 are maintained over time, owing to said conveying surface 19, in the position and the orientation that they had when they were being deposited. The objects 2 deposited on the conveying surface 19 of the conveyor 18 are in particular maintained in the position and the orientation that they had on the conveyor 18 when they were being deposited, including when they were being moved by the conveyor 18, during acceleration phases and slowing down phases of the conveyor 18. No spontaneous repositioning or spontaneous reorientation of the objects 2 on the deposition plate is possible owing to said conveying surface 19. The objects 2 may be deposited on the conveying surface 19 of the conveyor 18 by any deposition means.

The system 10 according to the invention for packaging objects 2 that is shown in FIG. 4 comprises a digital image acquisition device 24 and a computer system (not shown in FIG. 4) for analyzing these digital images that is designed to generate digital data representative of the position of the objects 2 in relation to the conveying surface 19 from these digital images. The image acquisition device 24 is positioned substantially in line with the conveying surface 19 and downstream of a deposition area 25 designed to enable deposition of objects on the conveyor 18, such that the position of each object 2 deposited on the conveyor 18 in this deposition area 25 is analyzed. These digital data representative of the position of each object 2 on the conveyor 18 are transmitted to a system for controlling the actuation of robots, referred to as configuration robots 15, designed to be able to remove each object 2 on the conveying surface 19 of the conveyor 18, to move each removed object 2 between the conveyor 18 and a packaging plate 16, and to deposit the moved object 2 in a packaging container 17 for the objects 2 in a predetermined position of said packaging container 17. In the embodiment shown in FIG. 4, the packaging system 10 comprises a plate 16 for packaging and presenting containers 17 for packaging objects 2 that is similar to the packaging plate 16 described in FIG. 3. In the embodiment shown in FIG. 4, the packaging plate 16 is a fixed plate on which the packaging containers 17 are disposed in predetermined or determinable positions. The packaging containers 17 may be trays or crates provided or not provided with cells (not shown in FIG. 4), each cell being intended to receive a single object.

In the embodiment of a system 10 according to the invention for packaging objects 2 that is shown in FIG. 4, the set of objects 2 deposited on the conveying surface 19 in the upstream area 25 (in relation to the conveyor 18) of the conveyor 18 form a random set pattern 35. In practice, the objects are deposited manually (that is to say in bulk) in the upstream area of the conveyor such that the objects 2 are distributed in the form of a single layer, without partial or complete superposition of objects 2 on the conveying surface 19. The set of objects 2 thus deposited on the conveying surface so as to move in the direction 20 of movement of the conveyor 18 is presented to the image acquisition device 24 and the position of each object 2 of this set of objects 2 is determined in relation to the conveying surface 19. Owing to this determination of the position of each object 2 and of the elastically deformable conveying surface 19, each object 2 can be removed by one of the robots 15 and deposited in a packaging container 17 in which the set of objects deposited forms a predetermined set pattern in accordance with digital data representative of the position that each object 2 of the set of objects should have in the packaging container 17. The predetermined set pattern can depend on the nature of the objects 2 to be packaged and aims to optimize the filling of the packaging container 19 by the objects 2.

Figure 5:
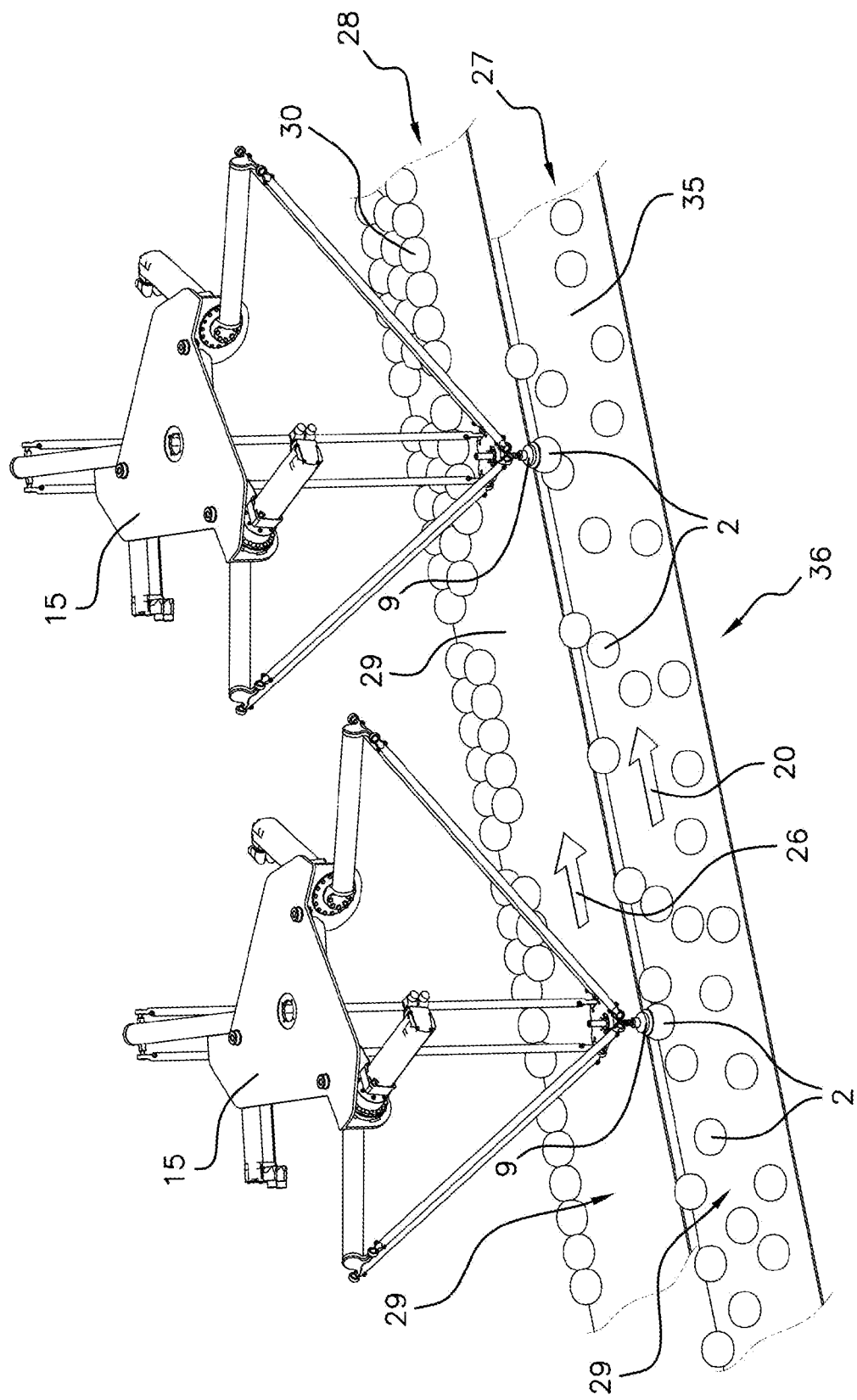
FIG. 5 is a perspective depiction of a third embodiment of an object packaging system according to the invention.

Another particular embodiment of a system 10 according to the invention for packaging objects 2 and an implementation of this packaging system 10 is shown in FIG. 5. In this embodiment, the object deposition surface is a conveying surface 19 of a first conveyor, referred to as supply conveyor 27, for conveying objects 2 in movement in a movement direction indicated in FIG. 5 by the arrow 20. The conveying surface 19 of said supply conveyor 27 is elastically deformable such that the deposition of each object 2 on said conveying surface 19 creates, under the effect of the weight of the object 2 in question, an imprint in said conveying surface 19 which tends to wedge said object 2 in this imprint. In the embodiment shown in FIG. 5, the image acquisition device is not shown. In this embodiment, the object packaging system 10 comprises a second conveyor, referred to as packaging conveyor 28, which is designed to be able to move the objects in a movement direction identified in FIG. 5 by the arrow 26. Said packaging conveyor 28 has a conveying surface 29 that is elastically deformable such that the deposition of each object 2 on said conveying surface 29 creates, under the effect of the weight of the object 2 in question, an imprint in said conveying surface 29 which tends to wedge said object 2 in this imprint. The objects 2 deposited on the conveying surface 29 of said packaging conveyor 28 are maintained in the position and the orientation that they had on said packaging conveyor 28 when they were being deposited by said configuration robot 15, including when they were being moved by said packaging conveyor 28, during acceleration phases and slowing down phases of said packaging conveyor 28. No spontaneous repositioning or spontaneous reorientation of the objects 2 on the conveying surface 29 is possible owing to said conveying surface 29. In the embodiment shown in FIG. 5, said conveyor 27 and said packaging conveyor 28 have substantially parallel directions of movement. However, there is nothing to stop these directions not being parallel, provided that said robots 15 are configured accordingly. In particular, the directions of movement 20, 26 of said supply conveyor 27 and packaging conveyor 28 may be orthogonal. Furthermore, the movement speeds applied to the objects 2 by said supply conveyor 27 and by said packaging conveyor 28 may be the same or different. In that case, it is necessary to be able to adapt the actuation speeds of the robots 15 accordingly. In the embodiment shown in FIG. 5, the objects 2 removed from said supply conveyor 27 are deposited on said packaging conveyor 28 in movement such that the objects 2 deposited on the conveying surface 29 of said packaging conveyor 28 form a plurality of predetermined geometric patterns. Owing to the conveying surface 29 of said packaging conveyor 28, each predetermined set pattern formed by the objects 2 on said packaging conveyor 28 when they are being deposited is maintained during the movement, during acceleration phases or slowing down phases of said packaging conveyor 28.

Figure 6:
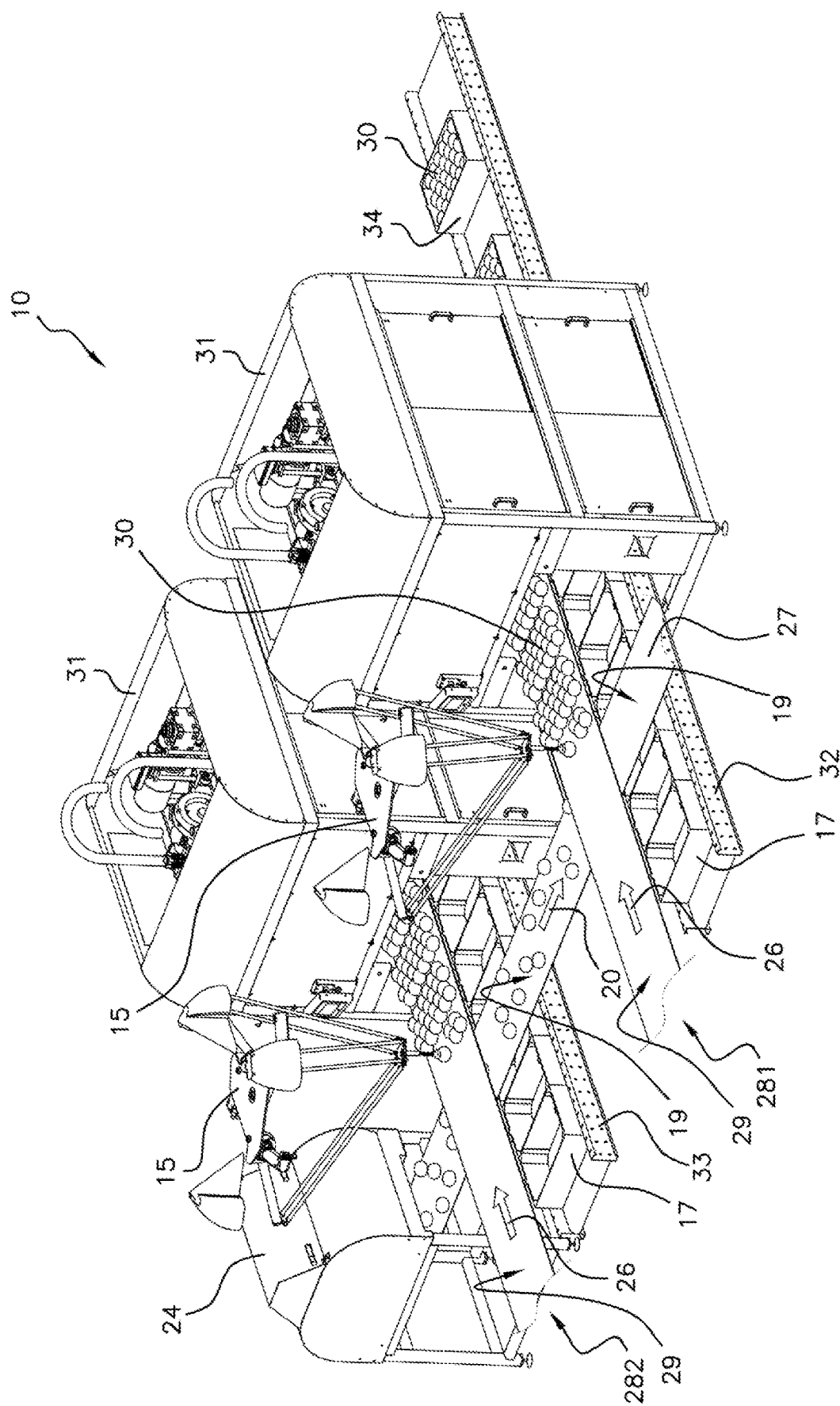
FIG. 6 is a perspective depiction of a fourth embodiment of an object packaging system according to the invention.

Another particular embodiment of a system 10 according to the invention for packaging objects 2 and an implementation of this packaging system 10 is shown in FIG. 6. In this embodiment, the system 10 for packaging objects 2 comprises a conveyor, referred to as supply conveyor 27, which has a conveying surface 19 for conveying objects 2 in movement in a movement direction identified in FIG. 6 by the arrow 20. The conveying surface 19 of said supply conveyor 27 is elastically deformable such that the deposition of each object 2 on said conveying surface 19 creates, under the effect of the weight of the object 2 in question, an imprint in said conveying surface 19 which tends to wedge said object 2 in this imprint. Thus, the objects 2 deposited on the conveying surface 19 of said supply conveyor 27 are maintained over time, owing to said elastically deformable conveying surface 19, in the position and the orientation that they had when they were being deposited, including when they were being deposited by said supply conveyor 27, during acceleration phases and slowing down phases of said supply conveyor 27. No spontaneous repositioning or spontaneous reorientation of the objects 2 on the conveying surface 19 of said supply conveyor 27 is possible owing to said conveying surface 19. The system 10 according to the invention for packaging objects 2 that is shown in FIG. 6 comprises a digital image acquisition device 24 and a computer system (not shown in FIG. 6) for analyzing these digital images as given in the description of FIG. 4.

The system 10 according to the invention for packaging objects 2 that is shown in FIG. 6 comprises two other conveyors, referred to as packaging conveyors 281, 282, for conveying objects 2, each of said packaging conveyors comprising a conveying surface 29 for conveying objects 2 in movement in a movement direction indicated in FIG. 6 by the arrows 26, which movement direction is perpendicular to the direction of movement of objects 2 moving on said supply conveyor 27. The conveying surface 19 of each of said packaging conveyors 281, 282 is elastically deformable such that the deposition of each object 2 on said conveying surface 19 creates, under the effect of the weight of the object 2 in question, an imprint in said conveying surface 19 which tends to wedge said object 2 in this imprint. In the embodiment shown in FIG. 6, said supply conveyor 27 is thus disposed so as to cross said packaging conveyors 281, 282 underneath them. However, there is nothing to stop said supply conveyor 27 being thus disposed so as to cross said packaging conveyors 281, 282 above them. The system 10 according to the invention for packaging objects 2 that is shown in FIG. 6 comprises two robots, referred to as configuration robots 15, that are disposed so as to be able to transfer the objects 2 moved by said supply conveyor 27 to said packaging conveyors 281, 282. The robots 15 may be of the type described in the description of FIG. 5 and in that case are adapted to the configuration of said supply conveyor 27 and packaging conveyors 281, 282.

In the embodiment shown in FIG. 6, each object 2 removed from said supply conveyor 27 by one of the robots 15 is deposited on one of said packaging conveyors 281, 282 in movement such that the objects 2 deposited on the conveying surface 29 of each packaging conveyor 281, 282 form a plurality of predetermined geometric patterns 30. Owing to the conveying surface 29 of said packaging conveyors 281, 282, each predetermined set pattern 30 formed by the objects 2 on said packaging conveyors 281, 282 is maintained during the movement, during acceleration phases or slowing down phases of said packaging conveyors 281, 282.

Each packaging conveyor 281, 282 of the system 10 according to the invention for packaging objects 2 that is shown in FIG. 6 is fitted with a robot 31 for simultaneously transferring the set of objects 2 forming the predetermined set pattern 30, by removing—notably by simultaneously removing—the set of these objects 2 forming this pattern 30 from said packaging conveyors 281, 282 and transferring said set of objects into an empty container 17 presented to one of the transfer robots 31 by a conveyor 32, 33 disposed so as to be able to supply said transfer robots 31 with empty containers 17. In this way, the objects 2 of the set of objects forming the predetermined set pattern 30 are packaged in the form of a pack 34 in which the objects exhibit the predetermined set pattern.

There may be numerous embodiment variants of the invention relating to the embodiments that are described above and shown in the figures.

The invention claimed is:

1. A method for packaging objects of a plurality of objects that belong to the fruit and vegetable group and have a shape such that the objects of the plurality of objects are able to roll over a surface; said method comprising the steps of:
depositing the objects of the plurality of objects on a solid surface, referred to as deposition surface, of a system for packaging said objects, said deposition surface being:
substantially horizontal;
suitable for receiving the objects of the plurality of objects; and
elastically deformable such that the deposition of each object on said deposition surface creates, under the effect of the weight of the object in question, an imprint in said deposition surface which tends to wedge said object in said imprint; and then
the objects of the plurality of objects deposited on said deposition surface and maintained in a position in relation to said deposition surface, referred to as deposition position, which is fixed during the deposition and maintained after the deposition owing to said deposition surface, are removed from said deposition surface for the purpose of packaging them in a packaging container,
wherein:
said deposition surface is a substantially horizontal conveying surface of a conveyor of the packaging system, said conveying surface being elastically deformable such that the deposition of each object on said conveying surface creates, under the effect of the weight of the object in question, an imprint in said conveying surface which tends to wedge said
object in said imprint, in that:
the objects of the plurality of objects are transported by
the conveyor and maintained in said deposition position during the transport owing to said conveying
surface, and in that:
the objects of the plurality of objects maintained in said
deposition position are removed from the conveyor
and transferred to a packaging area remote from this
conveyor in order to package them in the packaging
container, and wherein said method comprises:
a first step of randomly depositing objects of the plurality
of objects on a conveying surface of a first conveyor,
referred to as supply conveyor, which extends in the
upstream part of the packaging system, the conveying
surface of said supply conveyor being elastically
deformable such that the deposition of each object on
said conveying surface creates, under the effect of the
weight of the object in question, an imprint in said
conveying surface which tends to wedge said object in
said imprint, which means that the set of objects thus
deposited forms the random set pattern on the conveying surface of said supply conveyor, the random set
pattern being maintained on the conveying surface
while the objects are being transported by said supply
conveyor owing to the conveying surface; and
a step of removing the objects transported on said supply
conveyor; and
a second, subsequent step of depositing objects of the
plurality of objects on a conveying surface of a second
conveyor, referred to as packaging conveyor, which
extends in the downstream part of the packaging system, the conveying surface of said packaging conveyor
being elastically deformable such that the deposition of
each object on said conveying surface creates, under
the effect of the weight of the object in question, an
imprint in said conveying surface which tends to wedge
said object in said imprint, in such a way that the set of
objects of the plurality of objects thus deposited forms
a predetermined set pattern on the conveying surface of
said packaging conveyor;
the terms upstream and downstream being defined in
relation to a direction of movement of the objects.

2. The method as claimed in claim 1, wherein:
the objects of the plurality of objects forming the predetermined set pattern on the conveying surface of said
packaging conveyor are transported by said packaging
conveyor, the predetermined set pattern being maintained during the transport owing to said deformable
conveying surface; and
all or some of the objects of the plurality of objects
forming the predetermined set pattern are removed at
the same time from said packaging conveyor and
deposited in the packaging container.

3. The method as claimed in claim 2, wherein the objects
of the plurality of objects removed at the same time are
compacted so as to form a predetermined set pattern of
reduced size after compaction in the packaging container.

4. The method as claimed in claim 1, wherein an analysis
of said deposition position of each object on said deposition
surface is carried out and data representative of the position
of each object of the plurality of objects on said deposition
surface are produced from this analysis.

5. The method as claimed in claim 4 wherein:
said method comprises:
a first step of randomly depositing objects of the plurality
of objects on a conveying surface of a first conveyor,
referred to as supply conveyor, which extends in the
upstream part of the packaging system, the conveying
surface of said supply conveyor being elastically
deformable such that the deposition of each object on
said conveying surface creates, under the effect of the
weight of the object in question, an imprint in said
conveying surface which tends to wedge said object in
said imprint, which means that the set of objects thus
deposited forms the random set pattern on the conveying surface of said supply conveyor, the random set
pattern being maintained on the conveying surface
while the objects are being transported by said supply
conveyor owing to the conveying surface; and
a step of removing the objects transported on said supply
conveyor; and
a second, subsequent step of depositing objects of the
plurality of objects on a conveying surface of a second
conveyor, referred to as packaging conveyor, which
extends in the downstream part of the packaging system, the conveying surface of said packaging conveyor
being elastically deformable such that the deposition of
each object on said conveying surface creates, under
the effect of the weight of the object in question, an
imprint in said conveying surface which tends to wedge
said object in said imprint, in such a way that the set of
objects of the plurality of objects thus deposited forms
a predetermined set pattern on the conveying surface of
said packaging conveyor;
the terms upstream and downstream being defined in
relation to a direction of movement of the objects;
and wherein
the objects of the plurality of objects transported on said
supply conveyor are removed from said supply conveyor by a first robot, referred to as configuration robot,
on the basis of the data representative of said deposition
position of each object on the conveying surface and
transferred by said configuration robot to said packaging conveyor, on which they are deposited so as to form
the predetermined set pattern; and then
the objects of the plurality of objects forming the predetermined set pattern are removed at the same time from
said packaging conveyor and then deposited for the
purpose of packaging them in the packaging container.

6. A system for packaging objects of a plurality of objects
that belong to the fruit and vegetable group and have a shape
such that the objects of the plurality of objects are able to roll
over a surface, the system comprising:
at least one solid surface, referred to as deposition surface,
which is:
substantially horizontal;
elastically deformable such that the deposition of each
object on said deposition surface creates, under the
effect of the weight of the object in question, an
imprint in said deposition surface which tends to
wedge said object in said imprint; and
suitable for receiving the objects of the plurality of
objects and for maintaining each object in a position
in relation to said deposition surface, referred to as
deposition position, which is fixed during the deposition and maintained after the deposition owing to
said deposition surface; and
means for removing said objects deposited on said deposition surface and maintained in said deposition position owing to said deposition surface, in order to
package them in a packaging container, wherein said deposition surface is a conveying surface of a first conveyor, referred to as supply conveyor, which is located in the upstream part of the packaging system; said conveying surface being substantially horizontal and elastically deformable such that the deposition of each object on the conveying surface creates, under the effect of the weight of the object in question, an imprint in the conveying surface which tends to wedge said object in this imprint, said supply conveyor having:
   an upstream area for the random deposition of objects on the conveying surface of said supply conveyor; and
   a downstream area for the withdrawal of the objects maintained in this random position in relation to said supply conveyor during the transport; and
   at least one robot, referred to as configuration robot, for withdrawing objects, transported on said supply conveyor, one at a time and for depositing these objects in such a way that the set of objects thus deposited forms a predetermined set pattern;
   the upstream area and downstream area of the supply conveyor being defined in a direction of advancement of said supply conveyor.

7. The system as claimed in claim 6, wherein the packaging system is fitted with at least one video device designed to be able to generate data representative of the deposition position of each of the objects on the conveying surface of said supply conveyor.

8. The system as claimed in claim 6, wherein said system comprises:
   a second conveyor, referred to as packaging conveyor, which is disposed downstream of said supply conveyor and comprises:
      an upstream area for the deposition of the objects of the plurality of objects such that the set of objects thus deposited forms a predetermined set pattern on the surface of said packaging conveyor; and
      a downstream area for the withdrawal of the objects maintained in this predetermined set pattern in relation to said packaging conveyor during the transport; and
   at least one second robot, referred to as packaging robot, for removing objects of the plurality of objects transported on said packaging conveyor in the predetermined set pattern and for depositing these objects in the predetermined set pattern in a packaging container.

9. The system as claimed in claim 8, wherein said packaging container comprises a solid conveying surface which is substantially horizontal and deformable such that the deposition of each object on the conveying surface creates, under the effect of the weight of the object in question, an imprint in the surface which tends to wedge said object in a position, referred to as deposition position, which is fixed in relation to the conveying surface (29) of said packaging conveyor.

10. A method for packaging objects of a plurality of objects that belong to the fruit and vegetable group and have a shape such that the objects of the plurality of objects are able to roll over a surface; said method comprising the steps of:
   depositing the objects of the plurality of objects on a solid surface, referred to as deposition surface, of a system for packaging said objects, said deposition surface being:
      substantially horizontal;
      suitable for receiving the objects of the plurality of objects; and
      elastically deformable such that the deposition of each object on said deposition surface creates, under the effect of the weight of the object in question, an imprint in said deposition surface which tends to wedge said object in said imprint; and then
   the objects of the plurality of objects deposited on said deposition surface and maintained in a position in relation to said deposition surface, referred to as deposition position, which is fixed during the deposition and maintained after the deposition owing to said deposition surface, are removed from said deposition surface for the purpose of packaging them in a packaging container,
      wherein an analysis of said deposition position of each object on said deposition surface is carried out and data representative of the position of each object of the plurality of objects on said deposition surface are produced from this analysis, and
      wherein said method further comprises:
   a first step of randomly depositing objects of the plurality of objects on a conveying surface of a first conveyor, referred to as supply conveyor, which extends in the upstream part of the packaging system, the conveying surface of said supply conveyor being elastically deformable such that the deposition of each object on said conveying surface creates, under the effect of the weight of the object in question, an imprint in said conveying surface which tends to wedge said object in said imprint, which means that the set of objects thus deposited forms the random set pattern on the conveying surface of said supply conveyor, the random set pattern being maintained on the conveying surface while the objects are being transported by said supply conveyor owing to the conveying surface; and
   a step of removing the objects transported on said supply conveyor; and
   a second, subsequent step of depositing objects of the plurality of objects on a conveying surface of a second conveyor, referred to as packaging conveyor, which extends in the downstream part of the packaging system, the conveying surface of said packaging conveyor being elastically deformable such that the deposition of each object on said conveying surface creates, under the effect of the weight of the object in question, an imprint in said conveying surface which tends to wedge said object in said imprint, in such a way that the set of objects of the plurality of objects thus deposited forms a predetermined set pattern on the conveying surface of said packaging conveyor;
      the terms upstream and downstream being defined in relation to a direction of movement of the objects; and wherein
   the objects of the plurality of objects transported on said supply conveyor are removed from said supply conveyor by a first robot, referred to as configuration robot, on the basis of the data representative of said deposition position of each object on the conveying surface and transferred by said configuration robot to said packaging conveyor, on which they are deposited so as to form the predetermined set pattern; and then
   the objects of the plurality of objects forming the predetermined set pattern are removed at the same time from said packaging conveyor and then deposited for the purpose of packaging them in the packaging container.

* * * * *